US007656864B2

(12) United States Patent
McNiff et al.

(10) Patent No.: US 7,656,864 B2
(45) Date of Patent: Feb. 2, 2010

(54) DATA NETWORK COMPUTING DEVICE CALL PROCESSING

(75) Inventors: Peter Gerald McNiff, Kirkland, WA (US); Michael Thomas Wilhoite, Redmond, WA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 11/582,145

(22) Filed: Oct. 17, 2006

(65) Prior Publication Data

US 2007/0037569 A1 Feb. 15, 2007

Related U.S. Application Data

(63) Continuation of application No. 10/292,673, filed on Nov. 12, 2002, now Pat. No. 7,130,296, which is a continuation of application No. 09/154,977, filed on Sep. 17, 1998, now Pat. No. 6,560,216.

(51) Int. Cl.
*H04L 12/66* (2006.01)
*H04L 12/28* (2006.01)

(52) U.S. Cl. ...................... 370/352; 370/401

(58) Field of Classification Search ............ 370/352, 370/401
See application file for complete search history.

(56) References Cited

U.S. PATENT DOCUMENTS

| | | | |
|---|---|---|---|
| 5,159,592 A | 10/1992 | Perkins | |
| 5,325,362 A | 6/1994 | Aziz | |
| 5,642,185 A | 6/1997 | Altrieth, III et al. | |
| 5,708,655 A | 1/1998 | Toth et al. | |
| 5,717,737 A | 2/1998 | Doviak et al. | |
| 5,726,984 A | 3/1998 | Kubler et al. | |
| 5,729,544 A | 3/1998 | Lev et al. | |

(Continued)

FOREIGN PATENT DOCUMENTS

WO    WO 92/03878    3/1992

(Continued)

OTHER PUBLICATIONS

Geiger, Robert L., et al., "Wireless Network Extension Using Mobile IP", IEEE (1996), pp. 9-14.

(Continued)

*Primary Examiner*—Andrew Lee
(74) *Attorney, Agent, or Firm*—Occhiuti Rohlicek & Tsao LLP

(57) ABSTRACT

A telecommunications service node is connected to a data network using a packet data protocol and a telephone network using a circuit switched protocol. The service node is also connected to a wireless roaming network using the IS-41 signaling protocol. The service node stores status information, including location and registration information, for mobile computing devices connected to the data packet network. The location information includes a temporary data network address for visiting mobile computing devices. The service node manages voice calls to and from the mobile computing devices. If a call is received to a mobile computing device which is not registered, the service node will attempt to connect the call to a wireless telephone associated with the mobile computing device, or a predefined destination established as a preference by the user. In the case of a voice call between a telephone connected to the telephone network and a mobile computing device connected to the data network, the service node acts as a gateway and translates between the data packet protocol and the circuit switched protocol. A personal information manager executing in a mobile computing device may be used for managing call processing functions of the mobile computing device.

34 Claims, 5 Drawing Sheets

U.S. PATENT DOCUMENTS

| | | |
|---|---|---|
| 5,734,700 A | 3/1998 | Hauser et al. |
| 5,742,905 A | 4/1998 | Pepe et al. |
| 5,850,391 A | 12/1998 | Essigmann |
| 5,896,369 A | 4/1999 | Warsta et al. |
| 5,991,639 A | 11/1999 | Rautiola et al. |
| 6,009,330 A | 12/1999 | Kennedy, III et al. |
| 6,021,126 A * | 2/2000 | White et al. ............... 370/352 |
| 6,026,153 A | 2/2000 | Fuller et al. |
| 6,038,446 A | 3/2000 | Courtney et al. |
| 6,038,451 A | 3/2000 | Syed et al. |
| 6,052,725 A | 4/2000 | McCann et al. |
| 6,058,303 A | 5/2000 | Aström et al. |
| 6,065,120 A | 5/2000 | Laursen et al. |
| 6,069,890 A | 5/2000 | White et al. |
| 6,075,783 A | 6/2000 | Voit |
| 6,081,591 A * | 6/2000 | Skoog ...................... 379/230 |
| 6,104,711 A * | 8/2000 | Voit .......................... 370/352 |
| 6,118,778 A | 9/2000 | Amin |
| 6,122,263 A | 9/2000 | Dahlin et al. |
| 6,125,113 A | 9/2000 | Farris et al. |
| 6,131,028 A | 10/2000 | Whitington |
| 6,134,316 A * | 10/2000 | Kallioniemi et al. ... 379/220.01 |
| 6,137,791 A | 10/2000 | Frid et al. |
| 6,144,671 A * | 11/2000 | Perinpanathan et al. ..... 370/409 |
| 6,167,040 A | 12/2000 | Haeggstrom |
| 6,167,119 A | 12/2000 | Bartholomew et al. |
| 6,181,935 B1 * | 1/2001 | Gossman et al. ............ 455/433 |
| 6,185,204 B1 | 2/2001 | Voit |
| 6,198,920 B1 | 3/2001 | Doviak et al. |
| 6,215,790 B1 * | 4/2001 | Voit et al. .................... 370/401 |
| 6,219,694 B1 | 4/2001 | Lazaridis et al. |
| 6,222,829 B1 | 4/2001 | Karlsson et al. |
| 6,233,463 B1 * | 5/2001 | Wiedeman et al. ....... 455/552.1 |
| 6,236,653 B1 * | 5/2001 | Dalton et al. ............... 370/352 |
| 6,243,373 B1 | 6/2001 | Turock |
| 6,282,574 B1 | 8/2001 | Voit |
| 6,285,877 B1 | 9/2001 | Liu et al. |
| 6,295,293 B1 | 9/2001 | Tonnby et al. |
| 6,304,753 B1 | 10/2001 | Hartmaier |
| 6,317,484 B1 | 11/2001 | McAllister |
| 6,320,873 B1 | 11/2001 | Nevo et al. |
| 6,324,402 B1 * | 11/2001 | Waugh et al. ............... 455/445 |
| 6,366,777 B1 * | 4/2002 | Uusitalo ..................... 455/433 |
| 6,393,014 B1 | 5/2002 | Daly et al. |
| 6,400,946 B1 | 6/2002 | Vazvan et al. |
| 6,418,324 B1 | 7/2002 | Doviak et al. |
| 6,463,055 B1 | 10/2002 | Lupien et al. |
| 6,519,252 B2 * | 2/2003 | Sallberg ..................... 370/356 |
| 6,542,497 B1 | 4/2003 | Curry et al. |
| 6,542,739 B1 * | 4/2003 | Garner ....................... 455/427 |
| 6,560,216 B1 * | 5/2003 | McNiff et al. .............. 370/349 |
| 6,560,457 B1 | 5/2003 | Silver et al. |
| 6,608,832 B2 * | 8/2003 | Forslow ..................... 370/353 |
| 6,683,870 B1 | 1/2004 | Archer |
| 6,721,306 B1 | 4/2004 | Farris et al. |
| 6,744,875 B1 | 6/2004 | Wehrend et al. |
| 6,754,833 B1 | 6/2004 | Black et al. |
| 6,985,478 B2 * | 1/2006 | Pogossiants et al. ........ 370/352 |
| 7,127,250 B2 | 10/2006 | Gallagher et al. |
| 7,130,296 B2 * | 10/2006 | McNiff et al. .............. 370/349 |
| 7,280,530 B2 * | 10/2007 | Chang et al. ................ 370/352 |
| 2003/0076808 A1 | 4/2003 | McNiff et al. |
| 2003/0224795 A1 | 12/2003 | Wilhoite et al. |
| 2006/0223498 A1 * | 10/2006 | Gallagher et al. ........... 455/410 |
| 2007/0037569 A1 | 2/2007 | McNiff et al. |

FOREIGN PATENT DOCUMENTS

| | | |
|---|---|---|
| WO | WO 97/18916 | 5/1997 |
| WO | WO9959364 | 11/1999 |
| WO | WO0002406 | 1/2000 |
| WO | WO0008880 | 2/2000 |

OTHER PUBLICATIONS

Invitation to Pay Additional Fees, mailed Jan. 13, 2000 for Application No. PCT/US99/21341.

PCT International Search Report dated May 19, 2000 for Application No. PCT/US99/21341.

Press Release: Ericsson's intergration of GSM Mobile and Internet Technologies provides greater value to business users (Jul. 27, 1998).

Sirin Tekinay and Bijan Jabbari, "Handover and Channel Assignment in Mobile Cellular Networks", IEEE Communications Magazine, Nov. 1991, pp. 42-46.

Moe Rahnema, "Overview of the GSM System and Protocol Architecture", IEEE Communications Magazine. Apr. 1993, pp. 92-100.

* cited by examiner

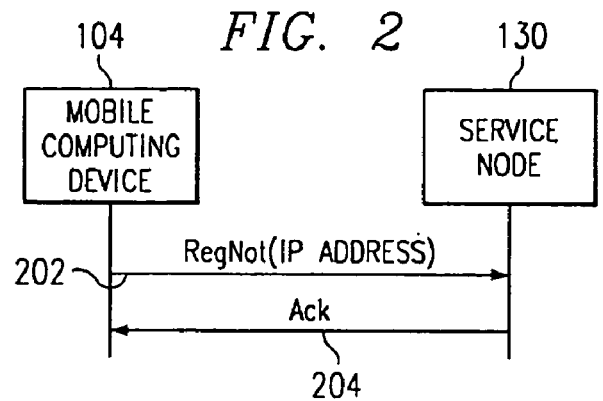
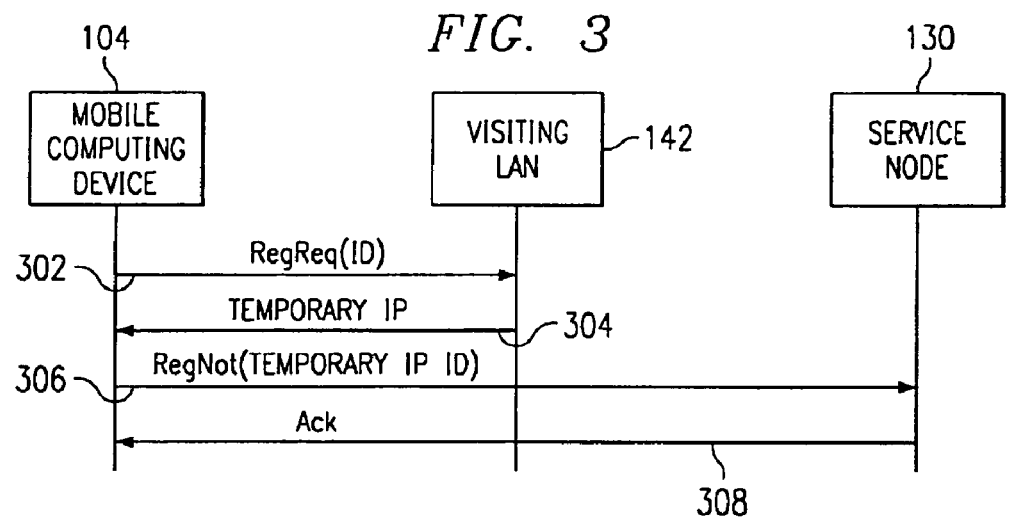
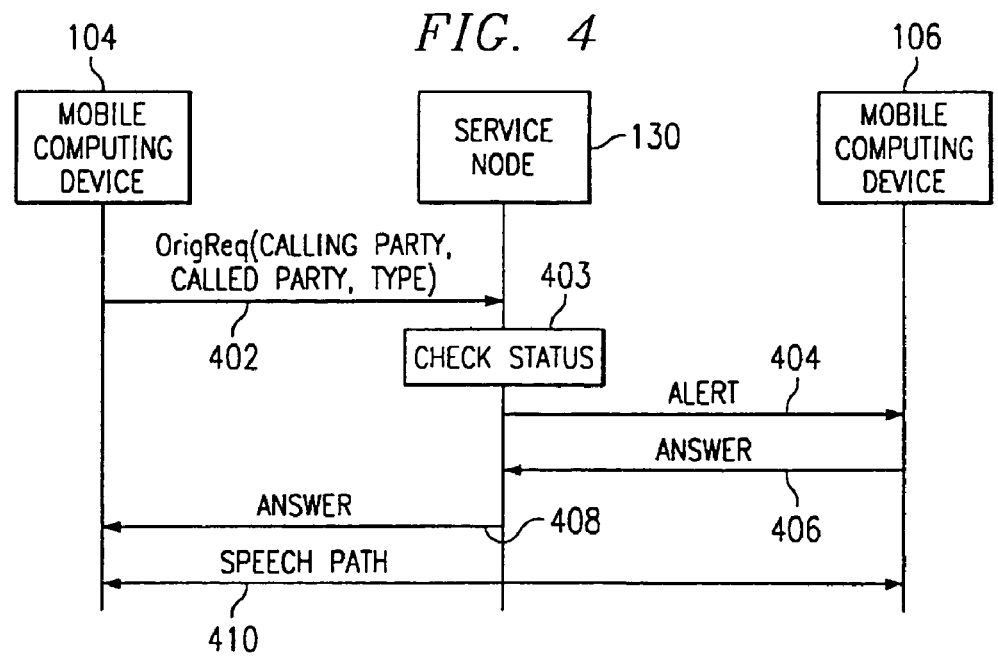

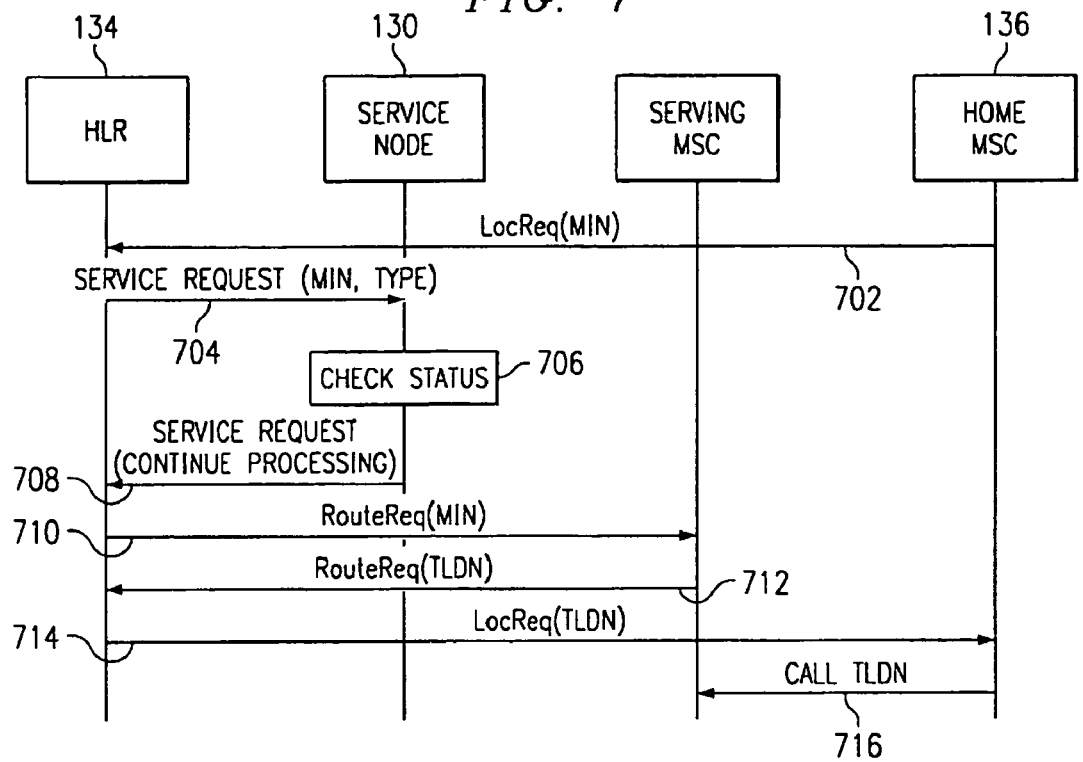
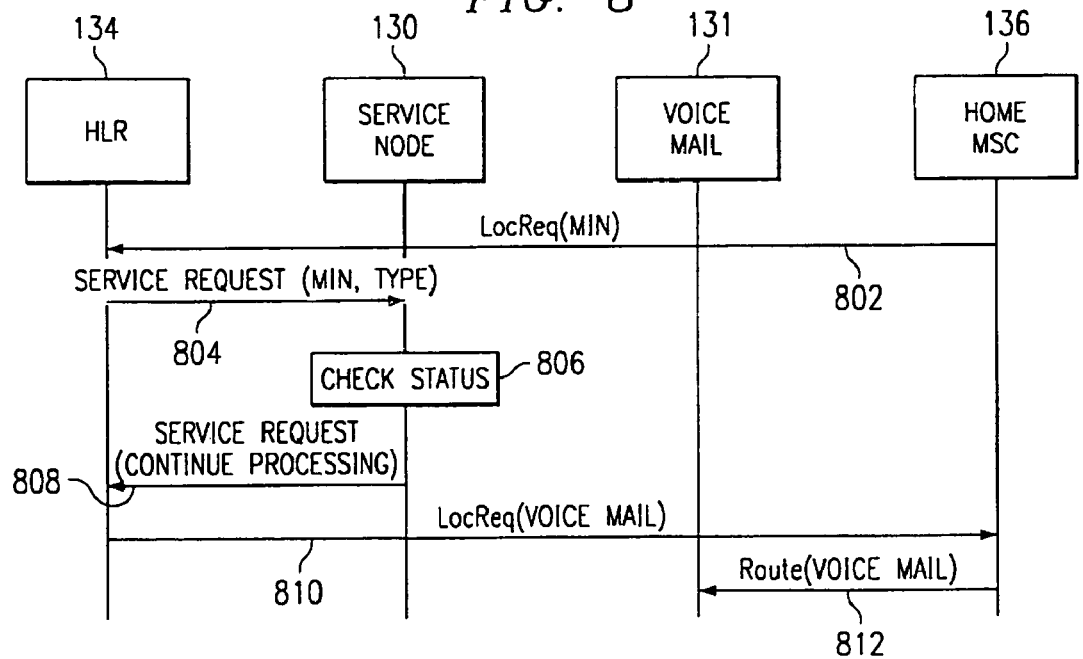

DATA NETWORK COMPUTING DEVICE CALL PROCESSING

CROSS-REFERENCE TO RELATED APPLICATIONS

This application is a continuation of U.S. application Ser. No. 10/292,673, filed Nov. 12, 2002, now U.S. Pat. No. 7,130, 296 which is a continuation of U.S. application Ser. No. 09/154,977 now U.S. Pat. No. 6,560,216, filed Sep. 17, 1998. These applications are incorporated herein by reference.

FIELD OF THE INVENTION

The present invention relates generally to call processing, location management and personal feature specification/control. More particularly, the present invention relates to processing voice calls to or from computing devices connected to a data network and mobile telephones connected to a cellular voice network and how communication is managed between the networks.

BACKGROUND OF THE INVENTION

Mobility is an important aspect of telecommunications services. Mobility management refers to the process of tracking and maintaining location information and status regarding a mobile communication device. For example, one of the reasons for the popularity of wireless telephones is that people who are highly mobile can still receive and place telephone calls from a single wireless telephone. Mobility management allows wireless telephones to move about within a service area while still being able to place and receive calls.

In addition to wireless telephones, mobile computing devices, such as laptop computers, palmtop computers, and personal digital assistants (PDAs), are becoming popular. Such devices are particularly useful for people who are highly mobile. These devices allow such individuals to connect to office networks while traveling. Mobility management with respect to mobile computing devices allows users of these devices to connect to data networks and to send and receive data while connected to the data networks from a location which is away from the devices home location.

One popular protocol for the exchange of information over data networks is Internet Protocol (IP). However, mobility management for such mobile computing devices presents a problem because IP was originally developed with the assumption that devices would be connected to the network at fixed locations. As such, a device would be assigned a unique IP address, which would define the device's physical connection to the network. Since a mobile computing device is not permanently connected to the network at any single point, an IP address associated with the mobile computing device does not define the device's physical connection to the network, thus violating an important assumption of IP addresses. Various techniques have been developed for mobility management as it relates to these mobile computing devices. One such technique is described in U.S. Pat. No. 5,159,592 which uses a nameserver and pseudo-IP addresses to associate fixed names of mobile units with the pseudo-IP addresses. Even though the pseudo-IP address may change, the current pseudo-IP address of a mobile unit can be determined by looking up the fixed name in the nameserver. A technique called tunneling is described in U.S. Pat. No. 5,325,362 which uses special routers to store current locations of mobile units in tables. When a router receives a packet for a mobile unit, the packet is forwarded, or tunneled, to the appropriate current location. U.S. Pat. No. 5,708,655 describes the assignment of temporary IP addresses to mobile units such that the mobile unit can provide the temporary IP address to another computer to effectuate the transfer of data between that computer and the mobile unit. These techniques provide some level of mobility management for mobile computing devices.

However, the above described techniques for mobility management for mobile computing devices focus on the data communication functions of these devices. However, it is noted that mobile computing devices can be configured with appropriate hardware and software so that these devices can engage in voice communication via a data network using IP. However, the techniques described above do not apply mobility management techniques to mobile computing devices being used for IP voice communication over data networks.

What is needed is an integrated mobility management solution for providing voice calling services to mobile computing devices connected to a data network.

SUMMARY OF THE INVENTION

In accordance with the invention, a telecommunication network node, referred to as a service node, maintains status information for mobile computing devices which are authorized to connect to a data network and obtain services from the node. The telecommunication network node manages voice calls placed to or from the mobile computing devices. The status information includes registration information indicating whether the mobile computing device is registered with the service node. The status information may also include address information indicating a temporary address of a visiting mobile computing device.

The mobile computing devices may engage in voice communication with other mobile computing device or with telephones connected to the telephone network. If both devices are mobile computing devices connected to the data network, the service node establishes a voice call over the data network using a packet data protocol, such as Internet Protocol (IP). The service node may monitor the call and provide additional services such as conferencing.

The management of voice calls placed to or from the mobile computing device includes determining whether a called mobile computing device is registered with the system. If the mobile computing device is registered, the service node establishes a voice path with the mobile computing device via the packet data network. If the mobile computing device is not registered, the service node looks up a mobile identification number associated with the mobile computing device and initiates a call to the wireless telephone associated with the mobile identification number via a wireless communication network.

In accordance with another aspect of the invention, the service node manages voice calls between mobile computing devices connected to the data network via a packet data protocol and telephones connected to the telephone network via a circuit switched protocol. The service node acts as a gateway arid translates between the packet data protocol and the circuit switched protocol so that the users of the mobile computing device and telephone can engage in a voice call.

In accordance with another aspect of the invention, a personal information manager application executing on a mobile computing device controls call processing preferences for the mobile computing device and associated wireless telephone.

These and other advantages of the invention will be apparent to those of ordinary skill in the art by reference to the following detailed description and the accompanying drawings.

BRIEF DESCRIPTION OF THE DRAWINGS

FIG. 2 is a message flow diagram showing the messages and processing which occurs when a mobile computing device registers with the service node on the mobile computing device's home network;

FIG. 3 is a message flow diagram showing the messages and processing which occurs when a visiting mobile computing device registers with the service node;

FIG. 4 is a message flow diagram showing the messages and processing which occurs when a mobile computing device on the data network places a voice call to another mobile computing device on the data network;

FIG. 7 is a message flow diagram showing the messages and processing which occurs when an outside telephone places a call to a telephone number associated with a mobile computing device, the mobile computing device is not registered with the service node, and the wireless telephone associated with the mobile computing device is active;

FIG. 8 is a message flow diagram showing the messages and processing which occurs when an outside telephone places a call to a telephone number associated with a mobile computing device, the mobile computing device is not registered with the service node, and the wireless telephone associated with the mobile computing device is inactive.

DETAILED DESCRIPTION

Figure 1:
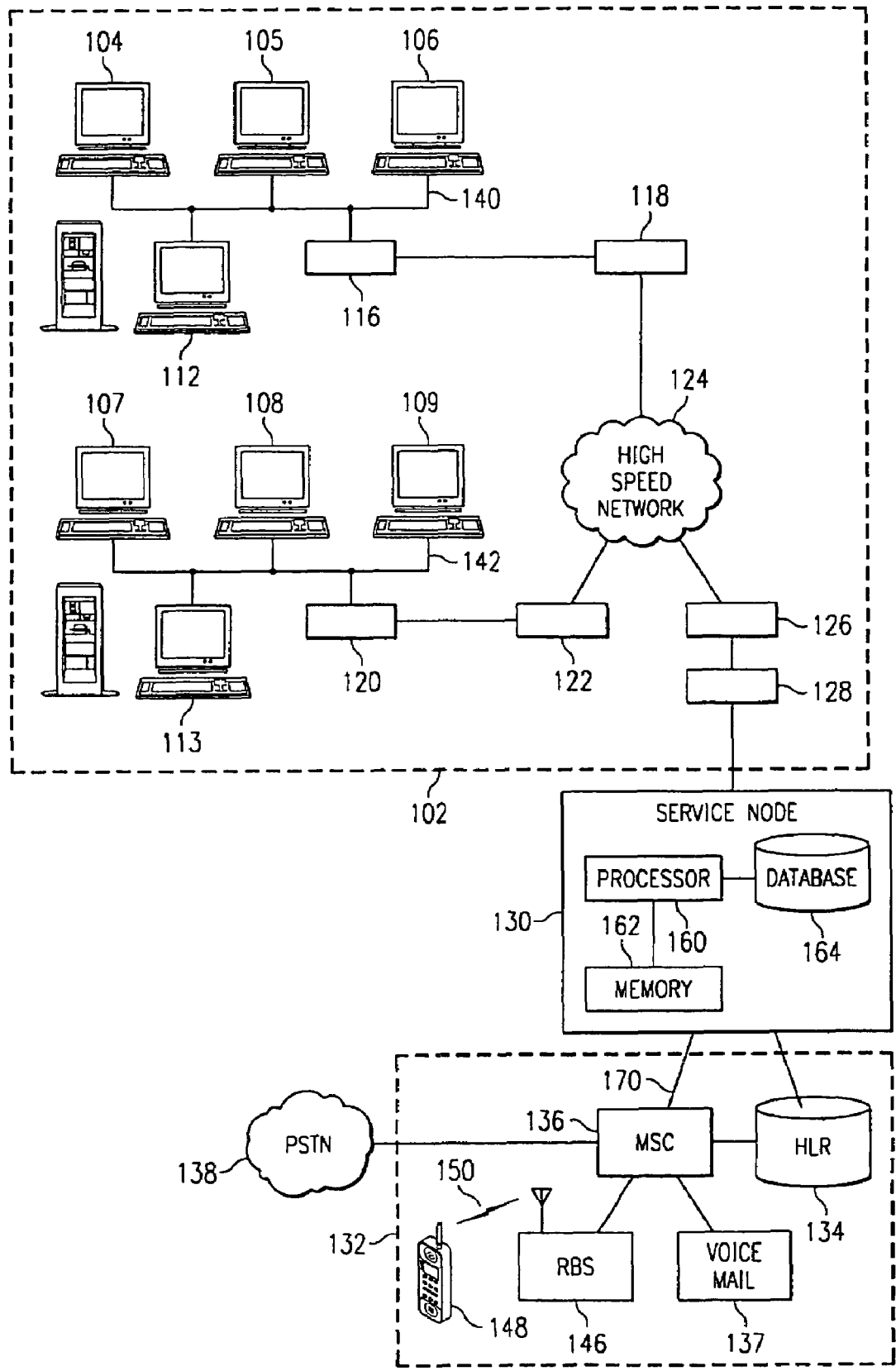
FIG. 1 shows a telecommunication network in which the present invention may be implemented.

FIG. 1 shows a telecommunication network in which the present invention may be implemented. A data network 102 includes local area networks (LAN) 140 and 142. Connected to LAN 140 are mobile computing devices 104, 105, 106. Also connected to LAN 140 is LAN server 112. LAN 140 is connected to high speed network 124 via hub 116 and router 118. Connected to LAN 142 are mobile computing devices 107, 108, 109. Also connected to LAN 142 is LAN server 113. LAN 142 is connected high speed network 124 via hub 120 and router 122. In one embodiment of the invention, the mobile computing devices are laptop computers configured with the appropriate hardware and software to allow the computers to engage in voice communication via the data network using a data network protocol such as IP. The architecture and components of data networks, such as data network 102, are well known in the art and will not be discussed in detail herein.

Also shown in FIG. 1 is a wireless communication network 132, which includes a mobile switching center (MSC) 136 connected to a Home Location Register (HLR) 134, a radio base station (RBS) 146, and a voice mail node 137. A wireless telephone 148 is communicating with RBS 146 via a wireless communication link 150. The MSC 136 is typically connected to more than one RBS, where each RBS provides wireless communication to wireless telephones operating within the geographic area (i.e., cell) served by the RBS. The MSC 136 controls the functions of the RBSs connected to it. Only one RBS 146 is shown in FIG. 1 for clarity. The HLR 134 is used to store user profiles of subscribers to the wireless communication network 132. The MSC 136 is also connected to the public switched telephone network (PSTN) 138, which allows wireless telephones to communicate with wired telephones in the PSTN 138. The configuration and operation of a wireless communication network, such as network 132, is well known in the art and will not be described in further detail herein.

A service node 130 is connected to the data network 102, the wireless communication network 132, and HLR 134. The service node 130 performs the mobility management functions for providing voice calling services to mobile computing devices in accordance with the present invention. Service node 130 is an intelligent network node which operates under control of a computer processor 160 executing computer program instructions. The service node 130 also includes memory 162 and database 164 for the storage of computer program instructions and other data.

Devices attached to the data network 102 are addressed using IP addresses. Thus, each device will have an IP address assigned to the device which uniquely identifies that device to the data network 102. The service node 130 is assigned a unique IP address on the data network 102 so that it may communicate with the other devices on the data network 102.

Nodes in the wireless communication network 132 are generally addressed using destination point codes which uniquely identify the nodes of the network. The service node 130 is assigned a unique destination point code on the wireless communication network 132 so that it may communicate with the other nodes on the wireless communication network 132.

The functioning of the service node 130 in accordance with the present invention will be described in connection with FIGS. 2-9. The following description is organized into sections according to the call scenario. Each scenario will be described in conjunction with a message flow diagram. The message flow diagrams show the network components in boxes at the top of the diagram with each box having an associated vertical line below it. Messages flowing between the network components are shown as horizontal lines starting at the vertical line associated with the message source and ending at the vertical line associated with the message recipient. The relative timing of the messages is represented by earlier messages being at the top of the diagram with subsequent messages continuing down the diagram.

1 Mobile Computing Device Registration on Home Network

This section will describe the steps performed when a mobile computing device registers with the service node 130 on the mobile computing device's home network. A home network is defined as the network to which the mobile computing device most often connects. When connecting to the home network, a mobile computing device uses its permanent IP address which is stored in the memory of the mobile computing device. FIG. 2 is a message flow diagram showing the messages passed when a mobile computing device registers with the service node 130 on the mobile computing device's home network. Assume that mobile computing device 104 is connected to LAN 140 as shown in FIG. 1, and that mobile computing device 104 is registering with the service node 130. As shown in FIG. 2, the first message 202 is a registration notification (RegNot) from the mobile computing device 104 to the service node 130. The RegNot message 202 includes the permanent IP address of the mobile computing device 104.

It is noted that the database 164 of the service node 130 contains a profile of each mobile computing device which is authorized to connect to data network 102. This profile includes the permanent IP address of the: mobile computing device if the device has data network 102 as its home network. Therefore, when the service node 130 receives the IP address of mobile computing device 104 in message 202, the service node 130 recognizes mobile computing device 104 and allows it to register. If desired, the RegNot message 202 could also include a password that would be known to the service node 130. In such an implementation, the correct password would be required before the service node 130 would register the mobile computing device. Upon receipt of the RegNot message 202, the service node 130 stores information in database 164 indicating that mobile computing device 104 is registered. Service node then sends an acknowledgment (Ack) message 204 to the mobile computing device 104 acknowledging that the mobile computing device 104 is registered with the service node.

The registration process could be initiated in any number of ways. For example, registration could be initiated by an action by a user of a mobile computing device, such as a mouse click on an appropriate area of the screen. Alternatively, registration with service node 130 could be automatic every time the computer is turned on and is connected to the data network.

2 Visiting Mobile Computing Device Registration on Network

FIG. 3 is a message flow diagram showing the messages passed when a visiting mobile computing device registers with the service node 130. Assume that visiting mobile computing device 107 has connected to LAN 142, but that LAN 142 is not the home LAN of mobile computing device 107. Therefore, the mobile computing device 107 cannot use its permanent IP address while connected to LAN 142 because that IP address will not be recognized by LAN 142. In order to register, mobile computing device 107 sends a registration request (RegReq) message 302 to the router 122 on the LAN 142. The RegReq includes an identification of the mobile computing device 107. The router runs an application called a Dynamic Host Configuration Process which receives the RegReq message 302 including the identification of the mobile computing device 107 and assigns a temporary IP address to the mobile computing device 107. The temporary IP address will be used only while the mobile computing device 107 remains registered on LAN 142. The router 122 on LAN 142 returns the temporary IP address to the mobile computing device 107 in message 304. Upon receipt of the temporary IP address, the mobile computing device 107 sends a RegNot message 306 to the service node 130. This RegNot message 306 includes the temporary IP address as well as an identification of the mobile computing device 107.

Upon receipt of the RegNot message 306, the service node 130 checks the ID received in message 306 against its list of authorized devices to determine whether to register mobile computing device 107. If the mobile computing device 107 is authorized, then the service node 130 stores information in database 164 indicating that mobile computing device 107 is registered. Service node 130 then sends an acknowledgment (Ack) message 308 to the mobile computing device 107 acknowledging that the mobile computing device 107 is registered with the service node 130.

3 Mobile Computing Device Deregistration

In order for a mobile computing device to deregister with the service node 130, the mobile computing device transmits a deregistration message to the service node 130. The service node will then update its database to indicate that the mobile computing device is no longer registered.

Deregistration could be initiated in any number of ways. For example, deregistration could be initiated by an action by a user of a mobile computing device, such as a mouse click on an appropriate area of the screen. Alternatively, deregistration with service node 130 could be automatic every time the computer is turned off.

Further, deregistration could be initiated if the mobile computing device has been idle for a predetermined period of time. In this case, the deregistration could be tied to a screen saver, such that if the screen saver is activated, deregistration is initiated. Further, when the screen saver is deactivated (for example when a user performs some activity), re-registration could be automatically initiated.

4 Data Network Call Between Registered Mobile Computing Devices

FIG. 4 is a message flow diagram indicating the messages and processing which occurs when a mobile computing device on the data network 102 places a voice call to another mobile computing device on the data network 102. Assume that mobile computing device 104 wants to place a voice call to mobile computing device 106. Also assume that both mobile computing device 104 and mobile computing device 106 are registered with the service node 130.

In order to initiate the call, mobile computing device 104 sends an origination request (OrigReq) message 402 to the service node 130. The OrigReq message 402 includes an identification of the calling mobile computing device 104, an identification of the called mobile computing device 106, and the type of call (e.g., voice). The identification of the mobile computing device may be the IP address, or may be some other identification which the service node 130 recognizes as being associated with a particular mobile computing device. Upon receipt of the OrigReq message 402, the service node 130 checks the status of the called device in step 403. In order to check the status, the service node 130 performs a database 164 lookup to determine whether the called mobile computing device is registered with the service node 130. In this case, the service node 130 will determine that mobile computing device 106 is registered with the service node 130 and the service node 130 will send an alert message 404 to the mobile computing device 106. The alert could result in an audio and/or visual indication on the mobile computing device 106 that there is an incoming call to the device. Further, the alert could also include an identification of the calling party or device. At this point, the service node 130 establishes a through connection (i.e., speech path) 410 between mobile computing device 104 and mobile computing device 106 by linking the call from mobile computing device 104 to mobile computing device 106. This is accomplished using the IP addresses of the devices. Assuming that the user of mobile computing device 106 wishes to answer the call, the user performs an appropriate function (e.g., a mouse click) on the mobile computing device 106 which causes the mobile computing device 106 to send an answer message 406 to the service node 130. Upon receipt of the answer message 406, the service node 130 updates the status of the mobile computing devices 104 and 106 to indicated that they are engaged in a call. Mobile computing device 106 and mobile computing device 104 may communicate via speech path 410.

It is noted that the mobile computing devices communicate voice information using IP via LAN 140 which is a packet network. As such, the mobile computing devices must contain appropriate software and hardware so that they can engage in a voice call over the IP network. The transmission of voice over an IP network is well known in the art. For example, VoxPhone™ Pro 3.0 is a product available from E-Tech Canada Limited. VoxPhone™ is an IP telephony based PC application which performs calling functions between mobile computing devices.

The service node 130 monitors the progress of the call between mobile computing device 104 and mobile computing device 106. Service node is able to monitor the call because it knows the status of the mobile computing devices 104, 106 engaged in the call. When the status of a mobile computing device changes, updated information regarding the new status is sent to the service node 130 from the mobile computing device via IP. Thus, while the call is in progress, if another call comes in for one of the mobile computing devices, the service node 130 will know that the mobile computing device is currently engaged in a call. In such a situation, the mobile computing device could be notified that another call has come in (similar to call waiting), or the new caller could be notified that the called mobile computing device is busy and the new caller could possibly leave a message with a voice mail system. Further, since the service node 130 monitors the call, the service node 130 could provide other services, such as conferencing, three way calling, call forwarding, incoming call screening, outgoing call restrictions, short message service (SMS text to phone), message waiting indicator (MWI), and information services (e.g., stock quotes, meeting reminders, etc.).

Figure 5:
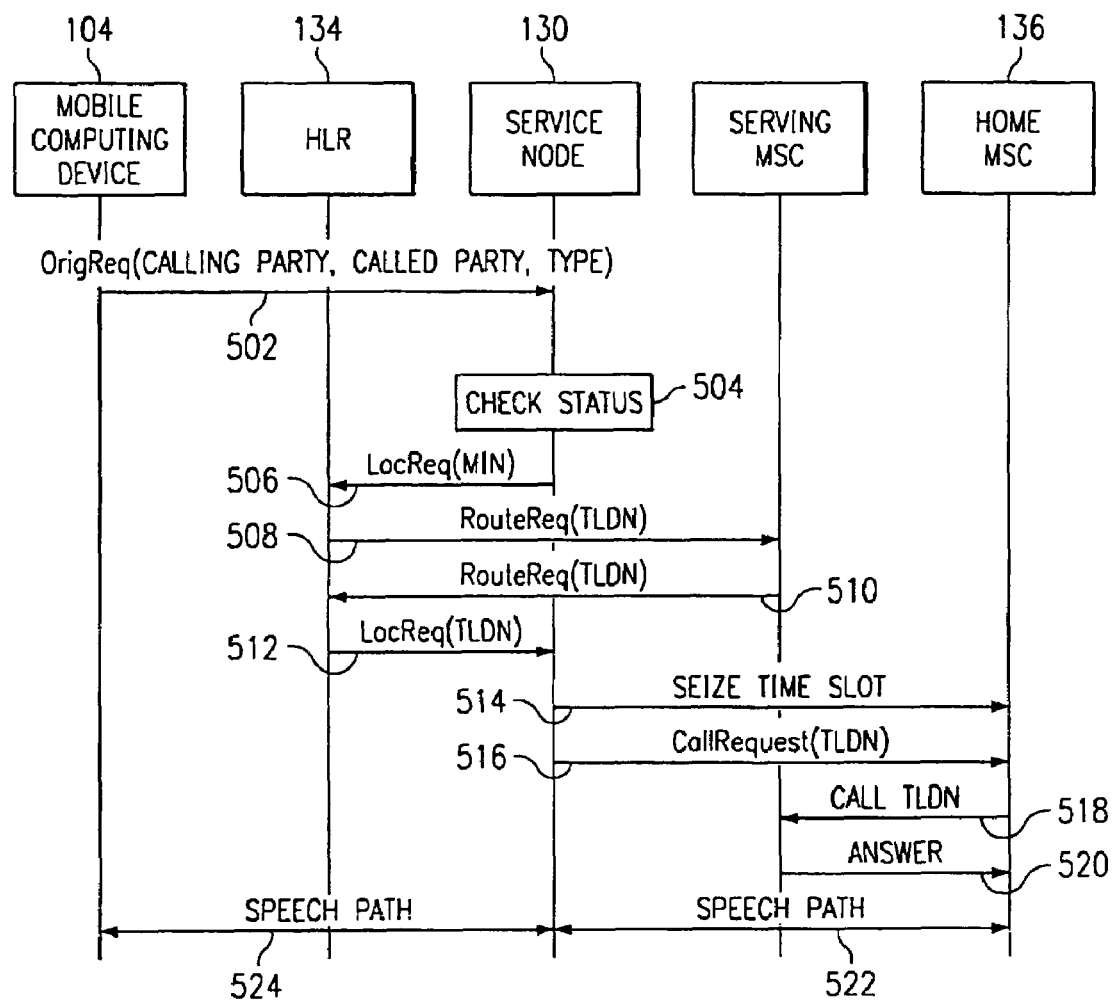
FIG. 5 is a message flow diagram showing the messages and processing which occurs when a mobile computing device on the data network places a voice call to a non-registered mobile computing device on the data network.

5 Data Network Call From a Registered Mobile Computing Device to a Non-Registered Mobile Computing Device FIG. 5 is a message flow diagram indicating the messages and processing which occurs when a mobile computing device on the data network 102 places a voice call to a non-registered mobile computing device on the data network 102. Assume that mobile computing device 104 wants to place a voice call to mobile computing device 106. Also assume that mobile computing device 104 is registered with the service node 130 but mobile computing device 106 is not registered with the service node 130.

In order to initiate the call, mobile computing device 104 sends an origination request (OrigReq) message 502 to the service node 130. This OrigReq message 502 is the same as message 402 described above in conjunction with FIG. 4. Upon receipt of the OrigReq message 502, the service node 130 checks the status of the called device in step 504 by performing a database 164 lookup to determine whether the called mobile computing device 106 is registered with the service node 130. In this case, the service node 130 will determine that mobile computing device 106 is not registered with the service node 130. Service node 130 will then attempt to connect the call from mobile computing device 104 to a wireless telephone associated with mobile computing device 106 as follows.

Service node 130 performs a database 164 lookup to determine a mobile identification number (MIN) associated with mobile computing device 106. As described above, the service node 130 stores information relating to each mobile computing device authorized to obtain service from the service node 130. Included in that information is a MIN associated with the mobile computing device. In addition, as well known in wireless communications, every MIN is associated with a particular HLR. A range of MINs will be associated with a particular HLR. The service node 130 stores a lookup table in database 164 which associates MINs with their HLR. Thus, upon determining the MIN, the service node 130 performs another database 164 lookup to determine the HLR associated with that MIN. Upon determining the MIN and associated HLR, the service node 130 sends a location request (LocReq) message 506 to HLR 134 in the wireless communication network. The LocReq message 506 includes the MIN.

The HLR 134 stores a profile for each MIN associated with the HLR 134. This profile includes an indication of whether the wireless telephone having the particular MIN is registered with the wireless network, and if so, the identification of the current serving MSC. Thus, upon receipt of the message 506, the HLR 134 determines the currently serving MSC and sends a route request (RouteReq) message 508 to that serving MSC. The serving MSC, upon receipt of message 508, assigns a temporary location directory number (TLDN) for the call to the wireless telephone associated with the MIN. The serving MSC returns the assigned TLDN to the HLR 134 in RouteReq message 510. The HLR 134 then transmits the TLDN to the service node 130 in LocReq message 512.

It is noted that messages 506, 508, 510, 512 are IS-41 messages. IS-41 is a telecommunications standard protocol which provides messages in support of mobility management. IS-41 is described in further detail in, *TIA/EIA/IS-41 Cellular Radiotelecommunications Intersystem Operations, Revision C*.

Upon receipt of the TLDN, the service node 130 seizes a time slot on MSC 136 using Integrated Services Digital Network User Part (ISUP) message 514. ISUP is part of the Signaling System No. 7 (SS7) protocol and is used for providing call control signaling functions and is well known in the art of telecommunications. The seized time slot will be used for communication with the wireless telephone. Service node 130 also sends an ISUP call request message 516 to the MSC 136 requesting that the MSC 136 place a call to the TLDN. The MSC 136 places the call to the TLDN using ISUP message 518, and the call is routed to the serving MSC and the serving MSC alerts the wireless telephone of the incoming call. If the wireless telephone answers, then the serving MSC sends an answer message 520 to the MSC 136. Thereafter, two speech paths are in place. Speech path 522 between the service node 130 and the MSC 136 is a circuit switched speech path. Speech path 524 between mobile computing device 104 and service node 130 is a packet data speech path. Thus, in order for a user of mobile computing device 104 to engage in a voice call with the wireless telephone, the service node 130 must translate between the circuit switched protocol and the packet data protocol, thus bridging speech path 524 and speech path 522. Techniques used to bridge standard voice (circuit switched) traffic with IP data is well known in the art and described in the *International Telecommunications Union (ITU), Specification H.323, Visual Telephone Systems and Equipment for Local Area Networks Which Provide a Non-Guaranteed Quality of Service—Series H: Audiovisual and Multimedia Systems Infrastructure of Audiovisual Services—Systems and Terminal Equipment for Audiovisual Services Study Group* 15.

Figure 6:
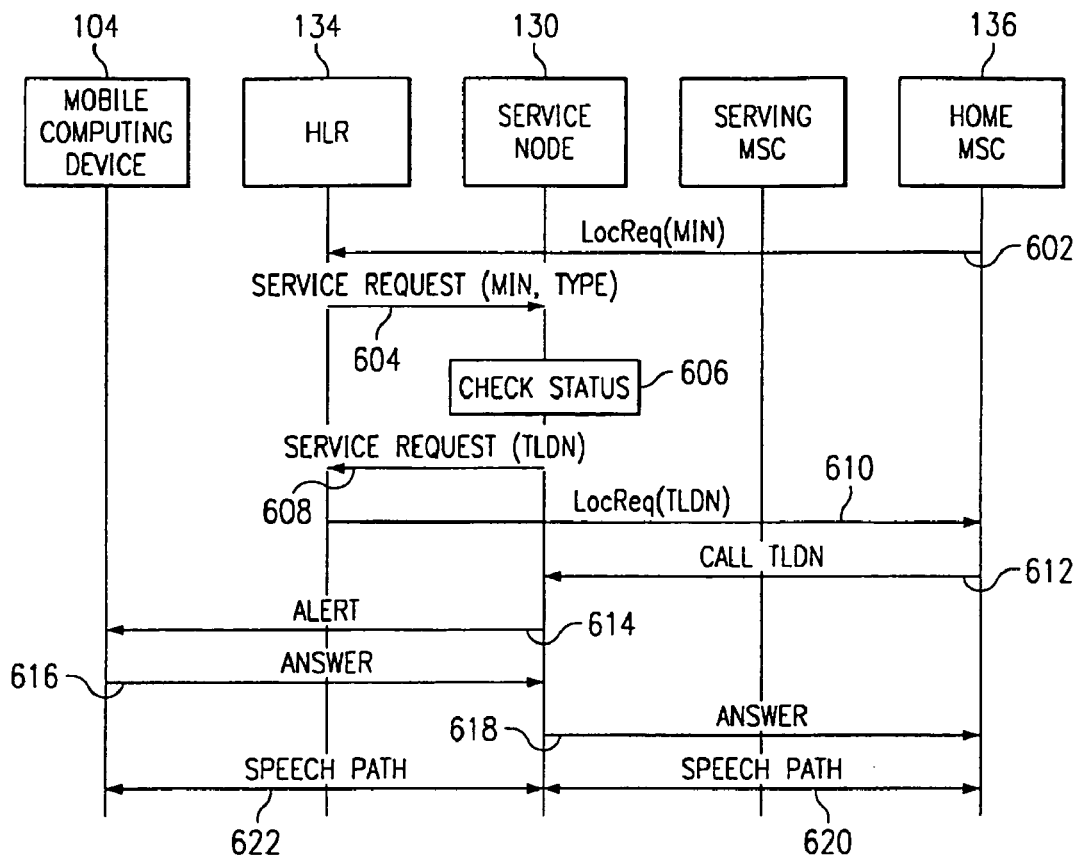
FIG. 6 is a message flow diagram showing the messages and processing which occurs when an outside telephone places a call to a telephone number associated with a mobile computing device and the mobile computing device is registered with the service node.

6 Call to Data Network Computing Device from an Outside Device when Computing Device is Registered FIG. 6 is a message flow diagram indicating the messages and processing which occurs when an outside telephone places a call to a telephone number associated with a mobile computing device and the mobile computing device is registered with the service node 130. It is noted that this telephone number could be associated with the mobile computing device an/or a wireless telephone. Assume for purposes of this example that the telephone number dialed by the outside telephone is a MIN associated with a wireless telephone in the wireless telephone network. However, if the user of the telephone assigned that MIN is also a user of data network 102 and service node 103, then that user could have all calls placed to the MIN first be connected to the user's mobile computing device if the user's mobile computing device is registered with the service node 130. Such processing proceeds as follows.

Assume that an outside telephone places a call to a MIN associated with a user's wireless telephone. The call will be routed to the wireless telephone's home MSC 136. As is standard wireless telephone call processing, the MSC 136 sends a LocReq message 602 including the dialed MIN to the HLR 134 in order to determine the current location of the wireless telephone. However, since the user of the wireless telephone is also a user of data network 102 and service node 130, the user has set up his/her user profile in HLR 134 to indicate that any calls to the MIN first be attempted to be connected via the data network 102. As such, upon receipt of message 602, the HLR 134 sends a service request message 604, including the MIN and type, to the service node 130. Upon receipt of the service request message 604, the service node 130 performs a database 164 lookup to determine the identification of the mobile computing device associated with the received MIN. Such an identification will advantageously be the IP address of the mobile computing device. Upon determining the associated mobile computing device, the service node 130 checks the status of the mobile computing device in step 606 by performing a database 164 lookup to determine whether the called mobile computing device is registered with the service node 130. In this case, the service node 130 will determine that mobile computing device 106 is registered with the service node 130.

The service node 130 will then select a TLDN from a pool of TLDNs associated with the service node and will send the TLDN to the HLR in service request message 608. Upon receipt of the TLDN, the HLR sends the TLDN to the MSC 136 in LocReq message 610. Upon receipt of the TLDN, the MSC 136 places a call to the TLDN using ISUP message 612, and the call is routed to the service node 130. Upon receipt of the call, the service node alerts the mobile computing device 104 in message 614. If the user of mobile computing device 104 answers the call, the mobile computing device 104 sends an answer message 616 to the service node 130. Upon receipt of the answer message 616, the service node 130 sends an answer message 618 to MSC 136. Thereafter, the MSC 136 connects the call to speech path 620 which is a circuit switched speech path between the service node 130 and the MSC 136. Similarly, a speech path 622 exists between mobile computing device 104 and service node 130. Speech path 622 is a data packet speech path. As described above, in order for a user of mobile computing device 104 to engage in a voice call with the calling telephone, the service node 130 must translate between the circuit switched protocol and the packet data protocol, thus bridging speech path 620 and speech path 622.

7 Call to Data Network Computing Device from an Outside Device when Computing Device is not Registered and Wireless Telephone Active FIG. 7 is a message flow diagram indicating the messages and processing which occurs when an outside telephone places a call to a telephone number associated with a mobile computing device, the mobile computing device is not registered with the service node 130, and the wireless telephone associated with the mobile computing device is active. Assume that an outside telephone places a call to a MIN associated with a user's wireless telephone. The call will be routed to the wireless telephone's home MSC 136. As is standard wireless telephone call processing, the MSC 136 sends a LocReq message 702 including the dialed MIN to the HLR 134 in order to determine the current location of the wireless telephone. However, since the user of the wireless telephone is also a user of data network 102 and service node 130, the user has set up his/her user profile in HLR 134 to indicate that any calls to the MIN first be attempted to be connected via the data network 102. As such, upon receipt of message 702, the HLR 134 sends a service request message 704, including the MIN and type, to the service node 130. Upon receipt of the service request message 704, the service node 130 performs a database 164 lookup to determine the identification of the mobile computing device associated with the received MIN. Upon determining the associated mobile computing device, the service node 130 checks the status of the mobile computing device in step 706 by performing a database 164 lookup to determine whether the called mobile computing device is registered with the service node 130. In this case, the service node 130 will determine that the mobile computing device is not registered with the service node 130. Thus, the service node 130 will return a service request message 708 indicating that the HLR 134 should continue processing in a manner consistent with normal cellular call processing.

The HLR 134 looks up the profile of the dialed MIN to determine the current serving MSC for the wireless telephone. The HLR 134 then sends a RouteReq message 710, including the MIN, to the current serving MSC. The serving MSC responds with a RouteReq message 712 including a TLDN. The HLR 134 forwards the TLDN to the home MSC 136 in LocReq message 714. Upon receipt of the TLDN, the MSC 136 places a call to the TLDN using ISUP message 716, and the call is routed to the serving MSC. At this point, the call is completed from the calling telephone to the wireless telephone in a conventional manner.

8 Call to Data Network Computing Device from an Outside Device when Computing Device is not Registered and Wireless Telephone Inactive FIG. 8 is a message flow diagram indicating the messages and processing which occurs when an outside telephone places a call to a telephone number associated with a mobile computing device, the mobile computing device is not registered with the service node 130, and the wireless telephone associated with the mobile computing device is inactive. Assume that an outside telephone places a call to a MIN associated with a user's wireless telephone. The call will be routed to the wireless telephone's home MSC 136. As is standard wireless telephone call processing, the MSC 136 sends a LocReq message 802 including the dialed MIN to the HLR 134 in order to. determine the current location of the wireless telephone. However, since user of the wireless telephone is also a user of data network 102 and service node 130, the user has set up his/her user profile in HLR 134 to indicate that any calls to the MIN first be attempted to be connected via the data network 102. As such, upon receipt of message 802, the HLR 134 sends a service request message 804, including the MIN and type, to the service node 130. Upon receipt of the service request message 804, the service node 130 performs a database 164 lookup to determine the identification of the mobile computing device associated with the received MIN. Upon determining the associated mobile computing device, the service node 130 checks the status of the mobile computing device in step 806 by performing a database 164 lookup to determine whether the called mobile computing device is registered with the service node 130. In this case, the service node 130 will determine that mobile computing device 106 is not registered with the service node 130. Thus, the service node 130 will return a service request message 808 indicating that the HLR 134 should continue processing in a manner consistent with normal cellular call processing.

The HLR 134 looks up the profile of the dialed MIN to determine the current serving MSC for the wireless telephone. In this example, the HLR 134 determines that the wireless telephone is not registered with the wireless communication network. Thus, the HLR 134 then sends a LocReq message 810 to the home MSC 136 indicating voice mail node 137. Upon receipt of the message 810, the MSC 136 routes the call to voice mail node 137 using ISUP message 812.

9 Data Network Computing Device Originates Call to Outside Telephone

Figure 9:
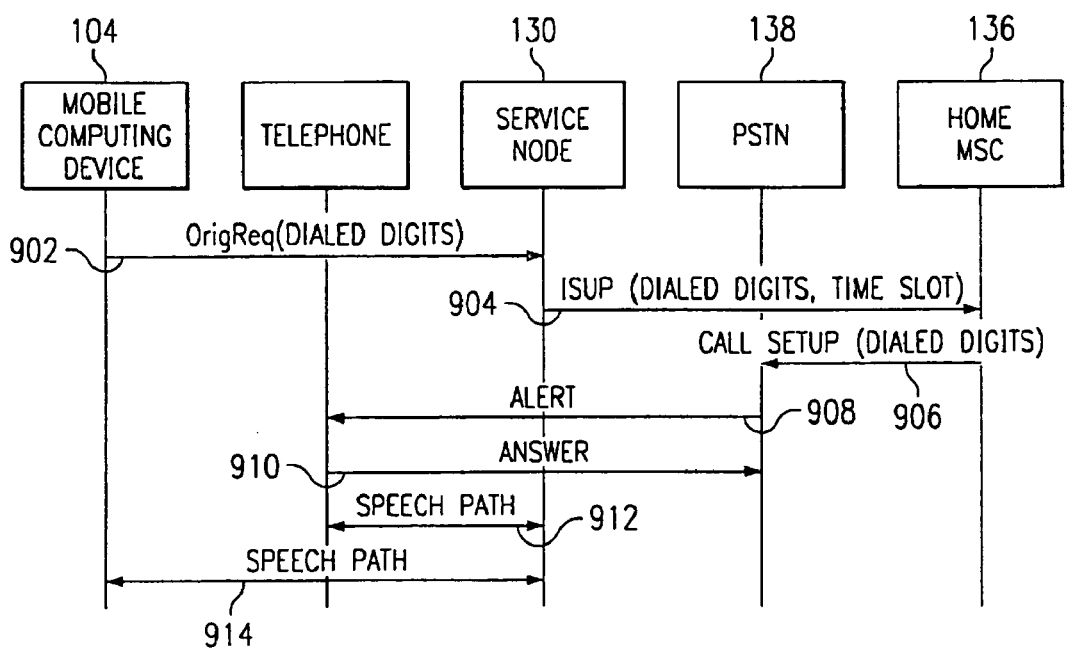
FIG. 9 is a message flow diagram showing the messages and processing which occurs when a mobile computing device originates a call to an outside telephone.

FIG. 9 is a message flow diagram indicating the messages and processing which occurs when a mobile computing device originates a call to an outside telephone. The mobile computing device 104 initiates the call by sending an origination request message 902, including the dialed digits, to the service node 130. Using ISUP, the service node 130 assigns a circuit and sends the dialed digits to the MSC 136 in message 904. The MSC 136 accepts the dialed digits as if this was a telephone call being initiated by a wireless telephone. The MSC 136 sets up the call by sending an ISUP message 906 to the PSTN 138 in a conventional manner. The telephone associated with the dialed digits is alerted using alert message 908 and when the telephone answers the call an answer message 910 is returned to the PSTN 138. In this manner, a circuit switched voice path 912 is set up between the service node 130 and the telephone, and a packet data voice path 914 is set up between the mobile computing device 104 and the service node 130. As described above, in order for a user of mobile computing device 104 to engage in a voice call with the called telephone, the service node 130 must translate between the circuit switched protocol and the packet data protocol, thus bridging speech path 912 and speech path 914.

10 Call Management Using Personal Information Manager

In accordance with another aspect of the invention, call processing may be based on information stored in a mobile computing device in connection with a personal information manager (PIM) application which is executing on the mobile computing device. As is well known, a PIM is a software application which executes on a computer and which is used for managing personal information of a user. For example, such personal information may include schedule data (e.g., meeting times) and contact data (e.g., telephone and address information).

In accordance with one aspect of the invention, information stored in the PIM can also be used for call processing management purposes. For example, consider a user using mobile computing device 104. If mobile computing device 104 is executing a PIM, the user of mobile computing device 104 will have schedule information stored on the PIM. Assume that one of the items stored in the PIM indicates that the user has a meeting scheduled for June 1 at 2 PM to 4 PM. The PIM may be linked to the call processing software of the mobile computing device so that if a call comes in to the mobile computing device, the PIM information will be used to make call processing decisions. For example, assume that the user of mobile computing device 104 has indicated in the PIM that the meeting from 2 PM to 4 PM is very important, and that all calls coming in to the mobile computing device between 2 PM and 4 PM are to be routed to voice mail. If a call comes in to the mobile computing device during the meeting time, the mobile computing device 104 will send an appropriate message to the service node 130 indicating that the user is not accepting calls. The service node 130 will recognize the message from the mobile computing device 104 and will route the call to voice mail.

In addition to schedule information, contact PIM information may be used for call processing by linking contact information (including name and telephone number) to selective call acceptance functions of the mobile computing device. For example, a user of a mobile computing device can indicate that only calls from particular telephone numbers will be accepted, or that calls from particular telephone numbers will always be rejected. The user can set up these calling functions using the names and associated telephone numbers stored in the PIM.

Thus, in accordance with the PIM processing aspects of the invention, certain PIM functions are linked to specific calling patterns, thus scheduling time and communications in the same way.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, although the invention is described in conjunction with a data network consisting of connected LANs, the principles of the present invention could be implemented utilizing any type of data network. For example, the mobile computing devices could utilize cable modems to connect to a cable television network which is used, at least in part, as a data network. Further, the data network could be the Internet, or some other public data network.

What is claimed is:

1. A communication system for providing telecommunication services comprising:

an interface to a data network and to a wireless telephone network; and a manager coupled to the interface for placing voice calls to and from user devices coupled to the data network, wherein the manager is configured to maintain in a database an association of an identity of a user in the wireless telephone network with a corresponding user device coupled to the data network; and wherein the manager is further configured to interact with the wireless telephone network to cause calls placed to the identity of said user in the wireless telephone network to be carried via the interface for onward routing to the corresponding user device coupled to the data network, and cause calls to a public switched telephone network (PSTN)

initiated at the corresponding user device coupled to the data network to be carried through the data network and subsequently through the interface for onward routing via the wireless telephone network to a destination in the PSTN such that the calls would appear to have been initiated by a user device coupled to the wireless telephone network.

2. The system of claim 1 further comprising a processor and computer program instructions stored in a memory that implement at least part of the manager.

3. The communication system of claim 1 wherein the data network includes a public data network.

4. The communication system of claim 1 wherein the system comprises a voice path gateway between the data network and the wireless telephone network for the calls placed to the identity of said user and for the calls initiated at the corresponding user device.

5. The communication system of claim 1 wherein the interface includes a first interface to the data network and a second interface to the wireless telephone network, and the system further comprises:

a gateway for coupling voice paths between the first interface and the second interface for the voice calls to and from the user device.

6. The communication system of claim 5 wherein the voice paths use a packet data protocol on the data network and a circuit switched protocol on the wireless telephone network.

7. The communication system of claim 1 wherein interacting with the wireless telephone network includes exchanging cellular radiotelecommunications messages with the one or more components of the wireless telephone network.

8. The communication system of claim 7 wherein the cellular radiotelecommunications messages include IS-41 standard messages.

9. The communication system of claim 1 wherein the communication system forms a service node of a telecommunications network.

10. The communication system of claim 1 wherein the manager is further configured to monitor the progress of calls to or initiated at the user devices coupled to the data network.

11. The communication system of claim 10 wherein the manager is further configured to provide mid-call features at the user devices coupled to the data network.

12. The communication system of claim 11 wherein the mid-call feature relates to disposition of a further call that comes in during the call in progress.

13. The communication system of claim 11 wherein the mid-call features includes one of a group consisting of call screening, outgoing call restrictions, short message text to phone service, message waiting indicator, and an information service.

14. The communication system of claim 1 wherein the manager is further configured to interact with the wireless telephone network to:

cause calls initiated at the corresponding user device coupled to the data network to be routed as if the calls were initiated at wireless telephones coupled to the wireless telephone network.

15. The communication system of claim 1 wherein interacting with the wireless telephone network to cause calls initiated at the user devices to be carried through the wireless telephone network includes interacting with a Mobile Switching Center (MSC) of the wireless communication network.

16. The communication system of claim 1 further comprising:

a data storage for holding registration information identifying those of the user devices that are registered to receive calls placed to corresponding destinations in the wireless telephone network.

17. The communication system of claim 16 wherein the data storage includes an association of mobile identification numbers and data network addresses of user devices corresponding to the mobile identification numbers.

18. The communication system of claim 16 wherein the manager is further configured to interact with the wireless telephone network to:

determine whether calls placed to users of the wireless telephone network are to be routed to user devices that are registered to receive calls placed to destinations in the wireless telephone network or routed to wireless telephones coupled to the wireless telephone network.

19. The communication system of claim 1 wherein the manager is further configured to permit mobility of users between the wireless telephone network and the data network.

20. The communication system of claim 1 wherein the manager is further configured to perform mobility management functions for the user devices.

21. A method for providing telecommunication services comprising:

maintaining in a database an association of an identity of a user in a wireless telephone network with a corresponding user device coupled to a data network;

causing voice calls placed to said user of the wireless telephone network to be routed to the corresponding user device coupled to the data network; and causing voice calls to the public switched telephone network (PSTN) initiated at the corresponding user device coupled to the data network to be routed through the data network to the wireless telephone network;

wherein causing the voice calls to be routed to the corresponding user device and causing voice calls to be routed to the wireless telephone network includes exchanging messages between a communication system and one or more components of the wireless telephone network, the communication system being coupled to the data network and to the wireless telephone network.

22. The method of claim 21 wherein causing voice calls to the public switched telephone network (PSTN) initiated at the user device coupled to the data network to be routed through the wireless telephone network includes exchanging messages with one or more components of the wireless network causing calls initiated at the user device to be further routed as if the calls were initiated at wireless telephones coupled to the wireless telephone network.

23. The method of claim 21 further comprising:

coupling voice paths between the data network and wireless telephone network for the voice calls placed to the users and the voice calls initiated at the user device.

24. The method of claim 21 wherein causing voice calls initiated at the user device coupled to the data network to be routed through the wireless telephone network includes exchanging messages with a Mobile Switching Center (MSC) of the wireless telephone network for causing calls initiated at the user device coupled to the data network to be routed.

25. The method of claim 21 further comprising monitoring the progress of calls to or initiated at the user device coupled to the data network.

26. The method of claim 25 wherein monitoring the progress of calls comprises providing mid-call features at the user device coupled to the data network.

27. The method of claim 21 further comprising performing mobility management functions for the user device.

28. A method for providing telecommunication services comprising:

maintaining in a database an association of an identity of a user in a wireless telephone network with a corresponding user device coupled to a data network;

causing voice calls to the public switched telephone network (PSTN) initiated at the corresponding user device coupled to a data network to be routed through a wireless telephone network including exchanging messages between a communication system and one or more components of the wireless telephone network, the communication system being coupled to the data network and to the wireless telephone network;

wherein causing voice calls initiated at the corresponding user device coupled to the data network to be routed through the wireless telephone network includes causing calls initiated at the user devices to be further routed as if the calls were initiated at wireless telephones coupled to the wireless telephone network.

29. The method of claim 28 wherein the one or more components of the wireless telephone network include at least one of a Home Location Register (HLR) and a Mobile Switching Center (MSC).

30. A method for providing telecommunication services comprising:

providing a manager coupled to an interface to a data network and to a wireless telephone network, wherein the manager is configured to maintain in a database an association of an identity of a user in the wireless telephone network with a corresponding user device coupled to the data network; and providing services by the manager to the corresponding user device coupled to the data network, wherein the services include at least one of a group of services consisting of a messaging service for passing messages between the wireless telephone network and user device on the data network, a voice call delivery service for connecting calls from the wireless telephone network through the data network to the user device, and a voice call delivery service for connecting calls from the user device through the data network to the wireless telephone network.

31. The method claim 30 wherein the messaging service includes a short message service (SMS).

32. The method of claim 30 wherein the services include at least two of the group of services.

33. A network communication system comprising:

a packet-based voice communication system, including user terminals coupled to a data network; and a service node coupled to a wireless telephone network and to the packet-based voice communication system, configured to exchange control information and at least one of voice and messaging data with elements of the wireless telephone network;

wherein the service node is configured to maintain in a database an association of an identity of a user in the wireless telephone network with a corresponding user device coupled to the data network; and wherein the service node is further configured to provide at least one of a group of services consisting of a messaging service for passing messages between the wireless telephone network and user devices on the data network, a voice call delivery service for connecting calls from the wireless telephone network through the data network to the user devices, and a voice call delivery service for connecting calls from the user devices through the data network to the wireless telephone network.

34. The system of claim 33 wherein the service node is coupled to at least some of the user terminals over a public data network.

* * * * *